US005397833A

United States Patent [19]

Arjunan

[11] Patent Number: 5,397,833
[45] Date of Patent: * Mar. 14, 1995

[54] COMPATIBILIZATION OF ELASTOMER BLENDS USING ETHYLENE/ACRYLATE/ACRYLIC ACID TERPOLYMERS

[75] Inventor: Palanisamy Arjunan, Dayton, N.J.

[73] Assignee: Exxon Chemical Patents Inc., Linden, N.J.

[ * ] Notice: The portion of the term of this patent subsequent to Jan. 25, 2011 has been disclaimed.

[21] Appl. No.: 146,640

[22] Filed: Nov. 1, 1993

Related U.S. Application Data

[62] Division of Ser. No. 827,772, Jan. 29, 1992, Pat. No. 5,281,651.

[51] Int. Cl.⁶ .......................... C08L 9/02; C08L 9/06; C08L 7/00; C08L 23/16
[52] U.S. Cl. .................................... 524/522; 525/221; 525/211; 525/194
[58] Field of Search .................. 525/221, 211; 524/522

[56] References Cited

U.S. PATENT DOCUMENTS

| | | | |
|---|---|---|---|
| 4,397,987 | 8/1983 | Cornell | 525/75 |
| 4,433,073 | 2/1984 | Sano et al. | 524/222 |
| 4,639,487 | 1/1987 | Hazelton et al. | 525/221 |
| 4,851,468 | 7/1989 | Hazelton et al. | 525/215 |
| 5,140,072 | 8/1992 | Takeshita | 525/215 |
| 5,281,651 | 1/1994 | Arjunan et al. | 525/221 |

FOREIGN PATENT DOCUMENTS 56-047441 4/1981 Japan .
57-135844 8/1982 Japan .

Primary Examiner—Carman J. Seccuro, Jr.
Attorney, Agent, or Firm—Catherine L. Bell

[57] ABSTRACT

This invention relates to a compatibilized rubber composition and a process for compatibilizing dissimilar rubber blends comprising blending an ethylene/acrylate/acrylic acid terpolymer with 2 or more different rubbers, selected from the group including, but not limited to, EPR, EPDM, CR, NBR, SBR and NR.

14 Claims, No Drawings

COMPATIBILIZATION OF ELASTOMER BLENDS USING ETHYLENE/ACRYLATE/ACRYLIC ACID TERPOLYMERS

This is a division of application Ser. No. 07/827,772, filed Jan. 29, 1992, now U.S. Pat. No. 5,281,651, on Jan. 25, 1989.

BACKGROUND OF THE INVENTION

1. Field of the Invention

This invention relates to the field of compatibilization technology. In particular, this invention relates to the use of ethylene/methacrylate/acrylic acid terpolymers as compatibilizers for dissimilar elastomer blends.

2. Description of the Related Art

A considerable amount of research has been made over the last several years with a view to obtaining new polymeric materials with enhanced specific attributes for specific applications or a better combination of different attributes. Much attention is currently being devoted to the simplest route for combining outstanding properties of different existing polymers, that is, formation of polymer blends. Although increasing numbers of miscible blends are reported in the literature [D. R. Paul et. al., J. Macromol. Sci., Rev. Macromol. Chem., C-18:109 (1980)], most polymers are nonetheless immiscible thus leading to heterophase polymer blends. In general, "compatibility (miscibility) is the exception, immiscibility is the rule" (Dobry and Boyer-Kawenski, J. Polymer Science, 1947).

There are two widely useful types of elastomer blends: single phase and two phase blends. The single phase blend is miscible. The term miscibility does not imply ideal molecular mixing but suggests that the level of molecular mixing is adequate to yield macroscopic properties expected of a single-phase material.

The formation of two-phase elastomer blend is not necessarily an unfavorable event since many useful properties, characteristic of a single phase, may be preserved in the blend composition while other properties may be averaged according to the blend composition. Proper control of overall elastomer blend morphology and good adhesion between the phases are in any case required in order to achieve good mechanical properties. The elastomer blend components that resist gross phase segregation and/or give desirable blend properties are frequently said to have a degree of "compatibility" even though in a thermodynamic sense they are not "miscible". It should be emphasized that "compatibility" and "miscibility" are two different terms. Compatibilization means the absence of separation or stratification of the components of the polymeric alloy during the expected useful lifetime of the product (Gaylord, N. G., in "Copolymers, Polyblends and Composites" Advances in Chemistry Series 142, American Chemical Society: Washington, D.C., 1975, p. 76). "Technological compatibilization" according to Coran and coworkers [Rubber Chem. Technol., 56, 1045 (1983)] is "the result of a process or technique for improving ultimate properties by making polymers in a blend less incompatible; it is not the application of a technique which induces "thermodynamic compatibility", which would cause the polymers to exist in a single molecularly blended homogeneous phase".

It is well established that the presence of certain polymeric species, usually block or graft copolymers with the right structure, can indeed result in compatibilization of an immiscible elastomer blend because of their ability to alter the interfacial situation. Such, species as a consequence, are often referred to as "compatibilizers" or "interfacial agents" which is analogous to the term "solubilization used in the colloid field to describe the effect surfactants have on the ability to mix oil and water (McBain et. al., "Solubilization and Related Phenomena", Academic Press, New York, 1955). Such "compatibilizers" can be either preformed and added to the binary blend or formed "in situ" during the blending process.

The role of the compatibilizer in an elastomer blend is manifold: (1) reduce the interfacial energy between the phases, (2) permit a finer dispersion during mixing, (3) provide a measure of stability against gross segregation, and (4) result in improved interfacial adhesion (G. E. Molau, in "Block Copolymers", Ed by S. L. Agarwal, Plenum, N.Y., 1970, p. 79).

Two elastomers form a compatible mixture when they have at least one of the following characteristics:

Segmental structural identity. For example, a graft or block copolymer of butadiene and styrene is compatible with either polybutadiene or polystyrene.

Miscibility or partial miscibility with each other. Solubility parameter ( ) difference $<$ 1, generally $<0.2$ units. For example, poly (vinyl chloride), PVC, poly (ethylacrylate), PEA, poly (methylacrylate), PMMA, have solubility parameters in the 9.4–9.5 range and form compatible mixtures. Although, the structure of nitrile rubber, NBR is entirely different from those of PVC, PMMA, PEA, it has a similar solubility parameter 9.5 and is compatible with these three polymers.

Functional groups capable of generating covalent, ionic, donor-acceptor or hydrogen bonds between the polymers.

Compatibilization of dissimilar elastomer blends is an area of active interest from both technological and scientific points of view. Many of the synthetic and natural elastomers have good properties that when combined with other rubbers of similar or complementary properties may yield desirable traits in the products.

Neoprene or polychloroprene rubber (CR) has been the material of choice in most power transmission belts, due to its unique combination of properties: ozone resistance, oil resistance, toughness, dynamic flex life, good adhesion to other materials and heat resistance up to 100° C. In the past, CR belts have kept pace with the needs of the automotive industry, but recently there is a need for new materials for more demanding applications. First of all, CR belts are encountering greater heat duress in service due to increasing underhood temperatures (up to 150° C.). Secondly, to meet automotive industry's longer warranty periods ("100,000 mile target"), the CR belts must have a lower failure rate with high mean life, even when high temperatures are not encountered. To meet these emerging needs, improvements in heat, ozone, and cut growth resistance of neoprene belts are desirable. The above requirement for neoprene belts could be satisfied by blending with polyolefin elastomers such as ethylene/propylene rubber (EPR) or ethylene/propylene/diene terpolymer (EPDM) which have better heat/ozone and cut growth resistance. As such, however, these neoprene/EPR or EPDM blends are incompatible.

Nitrile rubber (NBR) is used in automobiles because of its resistance to fuels, a variety of oils and other fluids over a wide range of temperatures. However, nitrile rubber, as such cannot be used in specific applications requiring high heat and ozone resistance. The poor ozone resistance and heat ageing properties of NBR (which is a random copolymer of acrylonitrile and butadiene) are believed to be the result of unsaturation in the backbone of the polymer which permits scission of the polymer chain to occur under certain adverse conditions.

EPDM rubber, on the other hand, has good heat ageing and ozone resistance because, its unsaturation sites are in side chains which render the polymer generally immune to scission of the backbone chain. However, these EPR or EPDM rubbers have poor oil resistance even in the cured state. It is desirable to achieve the best properties of both NBR and EPDM rubber, i.e. improved heat, ozone and oil resistance by blending the said rubbers synergistically. Such NBR/EPDM blends could find numerous applications in the automobile industry. As such, however, these NBR/EPDM blends are incompatible, because of the polarity difference between the blend components.

It is known in the art that the resistance of cured unsaturated elastomers such as polybutadiene or polyisoprene to chemical attack from ozone and oxygen can be enhanced by forming a blend thereof with minor amounts of an ethylene/propylene/diene terpolymer and co-vulcanizing the blend. This development takes advantage of the inherent resistance of the olefin/diene terpolymer to chemical attack and imparts this property into co-vulcanized blend.

However, the use of olefin/diene terpolymers in blends with other elastomers is often limited to those other elastomers which have a mutual compatibility and comparable cure rate behavior with respect to the olefin/diene terpolymer. Thus, whereas highly unsaturated elastomers such as polybutadiene or polyisoprene may be, in some cases reasonably compatible with olefin/diene elastomers and may be readily co-vulcanized because of the high availability of sites of ethylenic unsaturation, other elastomers such as polychloroprene, butadiene/acrylonitrile copolymers (nitrile) and like materials containing polar groups along the chain and/or a relatively low degree of ethylenic unsaturation are not so readily co-vulcanized. In the case of blends with these latter elastomers, chemical resistance may be improved due to the influence of the olefin/diene terpolymer, but often at the expense of a lowering of physical properties such as tensile strength, elongation, modulus and/or abrasion resistance of the co-vulcanizate as compared with the cured elastomer itself.

Furthermore, many rubber compounds contain carbon black as a filler to increase strength, rigidity and other factors. Thus, a rubber blend must also be able to incorporate carbon black to be of use in the automotive industry. However, for blends of dissimilar elastomers, problems can arise in achieving optimum carbon black distribution between the microphases of the final product. In blends of elastomers that differ significantly in terms of unsaturation or viscosity, carbon black tends to locate preferentially in the higher unsaturation or lower viscosity phase.

Carbon black aggregates may also transfer from one elastomer to another during mixing if they are contained in a polymer of low unsaturation, or in a masterbatch with high extender oil content and relatively low heat history. Polarity is also a factor controlling carbon black migration in elastomer blends. Carbon black has been shown to transfer or migrate between natural rubber (NR, polyisoprene), and polychloroprene (CR). However, it was observed that most of the carbon black in such a NR/CR blend remained at the interface—Marsh, P. A. Rubber Chem. and Tech. 41,344 (1968). Other research has shown undesirable displacement of the carbon black by more polar elastomers, Craig P. and Fowler R. B., Rubber World, 146(6), 79, (1962).

Thus, it would be of great importance to the art if a compatibilizer for dissimilar rubber blends such as CR/EPDM, NBR/EPDM could be found. It would be of further advantage to the art if this compatibilizer also caused delocalized dispersion of the carbon black in the above dissimilar rubber blends.

Use of an ethylene/acrylate/acrylic acid terpolymer as a compatibilizer for rubber blends is not known in the technology. Of tangential interest may be U.S. Pat. No. 4,607,074 to Hazelton where a cured rubber, an uncured rubber and a polyolefin are blended. The polyolefin is taught to be a copolymer of ethylene and unsaturated esters of $C_1$ to $C_4$ monocarboxylic acids. Hazelton does not disclose a terpolymer of ethylene/acrylate/acrylic acid.

In addition, U.S. Pat. No. 4,307,204 to DuPont discloses an expandable, curable elastomeric sponge composition based on ethylene/propylene/diene terpolymer (EPDM) elastomer or polychloroprene elastomer, which composition further contains a minor amount of an ionomer resin which is an ethylene polymer or copolymer containing at least about 50 mole percent acid functional groups, which groups are at least 50% neutralized by metal ions. These acid-modified ethylene polymers, which may also include acid-modified EPDM terpolymers, are disclosed to improve the balance of curing and expanding properties of the polymer composition when used to prepare cured expanded materials.

None of the aforementioned disclosures addresses the development of a compatibilized polychloroprene/EPDM or EPR or nitrile rubber/EPDM or EPR blends which not only exhibit improved resistance to ozone or oxygen attack and improved heat stability, but also exhibit a retention and in some cases improvement of important physical properties such as tensile strength, elongation, modulus and resistance to abrasion. Also, the said references do not address the issue of carbon black distribution in a binary, dissimilar elastomer blends and ways to improve the distribution of carbon black in both phases of such blends.

SUMMARY OF THE INVENTION

A new compatibilizer for dissimilar elastomer blends is disclosed herein. Ethylene/acrylate/acrylic acid terpolymers, have been found to compatibilize dissimilar elastomer blends, including, but not limited to, neoprene/EPDM, nitrile/EPDM blends, etc., by improving the properties of the said blends. The same compatibilizer also acts to cause delocalized dispersion of carbon black in a dissimilar elastomer blend. The present invention provides for neoprene/EPDM or EPR and nitrile/EPDM or EPR blend compositions and vulcanizates thereof having improved heat, ozone and cut growth resistance comprising a compatibilized blend of neoprene/EPDM (or EPR), or nitrile/EPDM (or EPR) and 5 to about 20% by weight, based on the content of total elastomer in the composition, of an ethylene/acrylate/acrylic acid terpolymer. The blends of this invention may be readily co-vulcanized and formed into shaped, heat, ozone, cut growth and oil resistant articles such as automotive drive belts and automotive hoses which not only exhibit improved heat, ozone and cut growth resistance but also have retained or enhanced physical properties such as abrasion resistance, modulus, elongation and tensile strength.

It has been found that terpolymers with the general structure ethylene/acrylate/acrylic acid "E/AC/AA" provide excellent mechanical compatibility with a wide range of polymers, both polar and nonpolar types. These terpolymers can be used to modify the adhesive and mechanical properties of dissimilar plastics, and rubber blends. The terpolymer is blended into the dissimilar, plastic, or rubber at anywhere from 1 to 65 phr, during the compounding of the blend preferably from 5 to 20 phr.

The ethylene/acrylate/acrylic acid (E/AC/AA) terpolymers used in this invention are excellent compatibilizers for nitrile rubber and ethylene/propylene rubber (NBR/EPR) blends, including nitrile rubber and ethylene/propylene/diene (NBR/EPDM) blends. The E/AC/AA terpolymers are also excellent compatibilizers for neoprene/EPR and neoprene/EPDM blends. Using the E/AC/AA terpolymer as a compatibilizer in these rubber blends also has the added advantage of causing delocalized dispersion of the carbon black. As previously discussed, carbon black tends to localize in one phase of a binary, dissimilar elastomer blend. This usually is undesirable and results in poor product properties. The E/MA/AA terpolymer causes the carbon black to be more uniformly dispersed in the components of the blend.

The ethylene/acrylate/acrylic acid terpolymer useful in this invention comprises a random copolymer of: ethylene, a lower alkyl acrylate, and an acrylic acid. The terpolymer has an acrylate content of from about 4% to about 30%, and an acrylic acid content of from about 1% to about 10%, by weight based upon the weight of the E/AC/AA terpolymer with the remainder being ethylene. The E/AC/AA terpolymer is preferably produced by well known free radical initiated polymerization methods.

The acrylates useful in this invention are lower alkyl; i.e., containing one to four carbon atoms, esters and include methacrylates. Methyl acrylate is particularly preferred.

The term acrylic acid is herein defined to include methacrylic acid.

The rubbers and the terpolymer, E/AC/AA, may be blended, formed, or otherwise mixed by any one of a number of suitable methods.

The rubbers useful in this invention include ethylene/propylene rubber, (EPR); ethylene/propylene/diene terpolymer, (EPDM); Poly(butadiene-co-acrylonitirile), -nitrile rubber (NBR); polychloroprene, (neoprene or CR rubber); styrene/butadiene rubber (SBR), and natural rubber (NR).

The EPR's useful in this invention are random copolymers of ethylene and propylene where the copolymer has an ethylene content of 30 to 85 wt. %, based upon the weight of the copolymer. The EP copolymer can be produced by the well known free radical polymerization method.

The EPDM Rubber useful in this invention are random copolymers ethylene/propylene/and a diene, where the ethylene is present at 35-80 wt. %, and the diene is present at 0 to 15 wt. %, based upon the weight of the copolymer. The EPDM polymer can be produced by the well known free radical polymerization method. The dienes useful in producing EPDM copolymers are typically 1,4-hexadiene, cycloalkylidene norbornenes, etc.

The nitrile rubbers useful in this invention are random copolymers of a major proportion of butadiene and a minor proportion of acrylonitrile and are typically produced by the free radical polymerization method.

The neoprene rubbers useful in this invention are polymers of chloroprene. These can be produced by the well known free radical polymerization method.

In particular, the terpolymer of this invention is useful for compatibilizing Neoprene/EPR; neoprene/EPDM; nitrile/EPR; nitrile/EPDM; neoprene/EPR/carbon black; neoprene/EPDM/carbon black; nitrile/EPR/carbon black and nitrile/EPDM/carbon black blends.

DETAILED DESCRIPTION OF THE INVENTION

This invention provides a process for compatibilizing rubber blends comprising blending an ethylene/acrylate/acrylic acid terpolymer with two or more different rubbers.

This invention further relates to compatibilized compositions of dissimilar rubber blends, a terpolymer of ethylene/acrylate/acrylic acid and optionally carbon black.

In essence, this invention provides a new approach for compounding rubber blends using an ethylene/acrylate/acrylic acid terpolymer as the compatibilizer. This approach also causes a delocalized dispersion of carbon black in the dissimilar elastomers blend. In particular, we have found that an ethylene/methacrylate/acrylic acid terpolymer is an excellent agent for compatibilizing neoprene/ethylene-propylene rubber; neoprene/ethylene-propylene-diene; nitrile rubber/ethylene-propylene rubber; and nitrile rubber/ethylene-propylene-diene blends. The E/AC/AA terpolymer, particularly ethylene/methacrylate/acrylic acid, also causes a highly desirable delocalization of carbon black added to the above blends.

E/AC/AA terpolymers useful in the present invention are sold by EXXON CHEMICAL CO. under the name Escor Acid Terpolymers. In particular, Escor ATX 350 and Escor ATX 320 are very useful.

The E/AC/AA terpolymers, as mentioned earlier, comprise random copolymers of ethylene, a lower alkyl acrylate, particularly methyl acrylate, and an acrylic acid. The acrylate and acrylic acid, in the singular, refer to both a single form and combinations of different forms of the compounds. Acrylic acid is herein further defined to include methacrylic acid.

In the preferred embodiment, the E/AC/AA terpolymer comprises an acrylate content of from about 4% to about 40%, more preferably from about 5% to about 35%, by weight, based on the weight of the E/AC/AA terpolymer, an acrylic acid or methacrylic acid content of from about 1% to about 10%, preferably 2% to 8%, by weight based on the weight of the E/AC/AA terpolymer. The rest of the terpolymer is, of course, ethylene.

The E/AC/AA terpolymer may comprise a wide range of melt indexes (MI), generally between about 0.1 to about 30, more preferably between about 1 to about 10, dg/min (ASTM D1238, Condition E).

Acrylates useful in the present invention are lower alkyl (meth) acrylate esters. Lower alkyl as used in describing this invention means those alkyl groups having from one to four carbon atoms. The preferred lower alkyl acrylate is methyl acrylate.

The E/AC/AA terpolymer may be produced by any one of a number of well known free radical initiated processes such as, for example, those described in U.S. Pat. No. 3,350,372 which is incorporated by reference for all purposes as if fully set forth. Generally ethylene, the (meth)acrylates and the (meth)acrylic acids are metered into, for example, a high pressure autoclave reactor along with any one of a number of well known free radical polymerization initiators (catalysts) suitable for producing ethylene and acrylic based polymers. Particularly preferred catalyst include organic peroxides such as, for example, lauroyl peroxide, di-tert butyl peroxide, tert butyl peroxide and various azo compounds. Typically, the catalyst will be dissolved in a suitable organic liquid such as benzene, mineral oil, or the like. Ordinarily the catalyst is used at a level of between about 50 to about 20,000, more preferably between about 100 to about 250, ppm based on the weight of monomers.

The polyolefins, E/AC/AA terpolymer and/or blend may, if desired, include one or more other well known additives such as, for example, antioxidants, ultraviolet absorbers, antistatic agents, release agents, pigments, colorants, or the like; however, this should not be considered a limitation of the present invention.

The rubbers which can be compatibilized using these terpolymers, include, but are not limited to, ethylene/propylene rubber, neoprene, nitrile rubber, ethylene/propylene/diene terpolymers, SBR, butyl, halobutyl, poly (isobutylene-co-4-Methylstyrene), poly(isobutylene-co-4-Bromomethyl styrene), natural rubber and the like.

The term EPR or EPDM as used herein, unless otherwise indicated, includes terpolymers, tetrapolymers, etc., preferably or ethylene, said $C_3$-$C_{28}$ alpha-olefin and/or a non-conjugated diolefin or mixtures of such diolefins which may also be used. The amount of the non-conjugated diolefin will generally range from about 0.5 to 20 wt. percent, preferably about 1 to about 7 wt. percent, based on the total amount of ethylene and alpha-olefin present.

Representative examples of non-conjugated dienes that may be used as the third monomer in the terpolymer include:
a. Straight chain acrylic dienes such as: 1,4hexadiene; 1,5-heptadiene; 1,6-octadiene.
b. Branched chain acrylic dienes such as: 5-methyl-1,4-hexadiene; 3,7-dimethyl 1,6-octadiene; 3,7-dimethyl 1,7-octadiene; and the mixed isomers of dihydro-myrcene and dihydro-cymene.
c. Single ring alicyclic dienes such as: 1,4-cyclo-hexadiene; 1,5-cyclooctadiene; 1,5-cyclododecadiene; 4-vinylcyclohexene; 1-allyl, 4-isopropylidene cyclo-hexane; 3-allyl-cyclopentene; 4-allyl cyclohexene and 1-isopropenyl-4-(4-butenyl) cyclohexane.
d. Multi-single ring alicyclic dienes such as: 4,4'-dicyclo- pentenyl and 4,4'-dicyclohexenyl dienes.
e. Multi-ring alicyclic fused and bridged ring dienes such as: tetrahydroindene; methyl tetrahydroindene; dicyclopentadiene; bicyclo (2.2.1) hepta 2,5-diene; alkyl, alkenyl, alkylidene, cycloalkenyl and cycloalkylidene norbornenes such as: ethyl norbornene; 5-methylene-6- methyl-2-norbornene; 5-methylene-6, 6-dimethyl-2-norbornene; 5-propenyl-2-norbornene; 5-(3-cyclo-pentyl)-2-norbornene and 5-cyclohexylidene-2-norbornene; norbornadiene; etc.

The most preferred EPDM elastomer contains from about 60 to about 80% by weight ethylene, from about 15 to about 35% by weight propylene and from about 3 to about 7% by weight of non-conjugated diene. Synthesis of EPDM is well known in the art. G. ver Strate, *Encyclopedia of Polymer Science and Engineering*, vol. 6, 2nd Ed., 1986, p. 522–564.

The polychloroprene elastomer used as the major component in the elastomer blend in one embodiment of the present invention is a commercially available material, commonly referred to as CR or neoprene rubber. It is available in a number of grades and molecular weights, all of which elastomeric grades are suitable for use in the compositions of this invention. The preferred grade is Neoprene GRT which is more resistant to crystallization and is based on a copolymer of chloroprene and 2,3-dichloro-1,3-butadiene. Neoprene synthesis is also well known in the art. C. A. Hargraves et al., *Encyclopedia of Polymer Science and Technology*, vol. 3, p. 705–730.

The nitrile rubber used as the major component in the elastomer blend in another embodiment of this invention is also a commercial material available in a number of grades. Nitrile rubber is a random copolymer of a major proportion of butadiene and a minor proportion of acrylonitrile and is generally produced by free radical catalysis.

As indicated above, the polychloroprene or nitrile rubber preferably constitutes the major component of the mixture of elastomers of the present invention, but may be generally present in a range of from about 30 to 90% by weight based on total elastomer content.

It is also within the scope of the present invention to provide elastomer compositions based on blends of the polychloroprene and nitrile rubber components.

The vulcanizable composition of the present invention also includes a conventional mixed vulcanizing system for EPR, polychloroprene and nitrile rubber. Generally such vulcanizing systems include a metal oxide such as zinc oxide, magnesium oxide and mixtures thereof, used either alone or mixed with one or more organic accelerators or supplemental curing agents such as an amine, a phenolic compound, a sulfonamide, thiazole, a thiuram compound, thiourea or sulfur. Organic peroxides may also be used as curing agents. The zinc or magnesium oxide is normally present at a level of from about 1 to about 10 parts by weight per 100 parts by weight of elastomer blend, and the sulfur and supplemental curing agents or curing accelerators, where used, may be present at a level of from about 0.1 to about 5 parts by weight per 100 parts by weight of elastomer blend.

The elastomer polymer composition may also contain other additives such as lubricants, fillers, plasticizers, tackifiers, coloring agents, blowing agents, and antioxidants.

Examples of fillers include inorganic fillers such as carbon black, silica, calcium carbonate, talc and clay, and organic fillers such as high-styrene resin, coumarone-indene resin, phenolic resins, lignin, modified melamine resins and petroleum resins.

Examples of lubricants include petroleum-type lubricants such as oils, paraffins, and liquid paraffins, coal tar-type lubricants such as coal tar and coal tar pitch;

fatty oil-type such as castor oil, linseed oil, rapeseed oil and coconut oil; tall oil; waxes such as beeswax, carnauba wax and lanolin; fatty acids and fatty acid salts such as licinoleic acid, palmitic acid, barium stearate, calcium stearate and zinc laurate; and synthetic polymeric substances such as petroleum resins.

Examples of plasticizers include hydrocarbon oils, e.g. paraffin, aromatic and naphthenic oils, phthalic acid esters, adipic acid esters, sebacic acid esters and phosphoric acid-type plasticizers.

Examples of tackifiers are petroleum resins, coumarone-indene resins, terpene-phenol resins, and xylene/formaldehyde resins.

Examples of coloring agents are inorganic and organic pigments.

Examples of the blowing agents are sodium bicarbonate, ammonium carbonate, N,N'-dinitrosopentamethylenetetramine, azocarbonamide, azobisisobutyronitrile, benzenesulfonyl hydrazide, toluenesulfonyl hydrazide, calcium amide, p-toluenesulfonyl azide, salicyclic acid, phthalic acid and urea.

The vulcanizable composition may be prepared and blended on any suitable mixing device such as an internal mixer (Brabender Plasticorder), a Banbury Mixer, a kneader or a similar mixing device.

The EP rubber or the EPDM is typically present at about 5 to 50 parts by weight, more preferably 25 to 35 parts by weight, most preferably 30 parts by weight. The terpolymer is typically present at 1 to 65 phr, more preferably 5 to 20 phr, most preferably 10 phr. The CR or NBR is typically present at 30 to 90 parts by weight, preferably 55 to 85 parts by weight, more preferably 65 to 75 parts by weight, most preferably 70 parts by weight. The carbon black may be present at from 3 to 50 parts per 100 parts rubber blend, preferably from about 20 to about 40 parts. Blending temperatures and times may range from about 45° to 180° C. and from about 4 to 10 minutes respectively. After forming a homogeneous mixture of the elastomers and optional fillers, processing aids, antioxidants and the like, the mixture is then vulcanized by the further mixing-in of crosslinking agents and accelerators followed by heating the resulting blend to a temperature of from about 100° to 250° C., more preferably from about 125° to 200° C. for a period of time ranging from about 1 to 60 minutes. Molded articles such as belts and hoses are prepared by shaping the prevulcanized formulation using an extruder or a mold, and subjecting the composition to temperatures and curing times as set forth above.

The materials utilized in the examples are described below:

(A) Neoprene (CR) GRT is a polychloroprene made by DuPont.

(B) Vistalon 7000 (abbr. V 7000) is a fast curing, high diene ethylene-propylene terpolymer (EPDM), available from EXXON CHEMICAL COMPANY, with a Mooney viscosity ML(1+4) @125° C. of 60 and an ethylene content of 70 wt. %.

(C) Escor/ATX 350 an ethylene/methacrylate/acrylic acid terpolymer, available from EXXON CHEMICAL COMPANY, comprising 24 wt. % methacrylate, 2 wt. % acrylic acid, 74 wt. % ethylene based upon the weight of the copolymers.

(D) Escor/ATX 320 an ethylene/methacrylate/acrylic acid terpolymer, available from EXXON CHEMICAL COMPANY, comprised of 18 wt. % methacrylate, 6 wt. % acrylic acid, 76 wt. % ethylene based upon the weight of the copolymers.

(E) N650 and N762 are two well known, general purpose, moderately reinforcing carbon blacks. They are standard as defined by ASTM D 1765-89 and are manufactured by a number of different companies including: Continental Carbon, J. M. Huber, Phillips Chemical, Columbian Chemicals, Cabot, and Ashland Chemical.

(F) Sundex 790 is a standard aromatic processing aid (oil) used for compounding of a variety of rubbers: NR, SBR, CR, IIR, NBR, BR, EPM, EPDM. Similar to the carbon blacks, it is manufactured by a number of companies: Harwick, Matrochem, R. E. Carroll.

(G) Octamine is an antioxidant used primarily with CR, NBR, NR, and SBR. It gives excellent protection against heat, oxygen, and flexing. Chemically, it is a reaction product of diphenyl-amine and diisobutylene. It is manufactured by Uniroyal Chemical.

(H) AgeRite HP-S is an antioxidant used in rubber compounding (similarly to Octamine). It is a blend of dioctylated diphenylamines and diphenyl-p-phenylene-diamine and is manufactured by R. T. Vanderbilt.

(I) Maglite D is a magnesium oxide, which is used as a curing agent in our compound. It is manufactured by C.áP. Hall and Merck Chemical.

(J) Paracil B is a nitrile rubber [poly(butadiene co-acrylonitrile)] available from Uniroyal.

The foregoing more general discussion this invention will be further exemplified by the following specific examples offered by way of illustration and not limitation of the abovedescribed invention.

The testing conditions and procedures used are set forth in Table A below.

TABLE A

| Test | | Testing conditions | Procedure |
|---|---|---|---|
| 1. | Mooney Viscosity (ML) | (1 + 8) @ 100° C. | ASTM D 1646 |
| | Mooney Scorch (MS) | 132° C. | ASTM D 1646 |
| 3. | Oscilating Disk Rheometer (ODR) | 160° C. +3° arc No preheat 100 cycles/min 30 min rotor | ASTM D 2084-88 |
| 4. | Procedures for mixing standard compounds and preparing standard vulcanized sheets | Pads Cured for 20 min @ 160° C. | ASTM D 3182-89 |
| 5. | Modulus, Tensile, Elongation | — | ASTM D 412 |
| 6. | Hardness (Durometer) | Shore A | ASTM D 2240 |
| 7. | Air Oven Age | 140° C. for 48 96 hr. | ASTM D 573 |
| 8. | Static Ozone Resistance | Bent Loop 100 pphm ozone 37.8° C. | ASTM D 1149-86 |
| 9. | Dynamic Ozone Resistance | 100 pphm ozone 37.8° C. Method A 30 cycles/min 0-25% extension | ASTM D 3395-86 |
| 10. | Dynamic Crack Growth (De Mattia)* | 120° C. flex angle Room temp. 90° C. flex angle 100° C. *Specimens cured 25 min @ 160° C. | ASTM D 813-87 |
| 11. | Tel-Tak | 24 oz., 60 sec, Room temp. | Instruction Manual Monsanto |

TABLE A-continued

| Test | Testing conditions | Procedure |
|---|---|---|
| 12. Melt Flow Rate | (10 kg 230° C.) | Tel-Tak Tester, July 1969 ASTM D 1238 |
| 13. Density | | ASTM D 792 |

EXAMPLES

I

Example 1

In an internal mixture (Banbury Intensive Mixer) were charged 100 part polychloroprene (neoprene GRT) and all other ingredients listed in Table 1 (below) Example 1 except for the magnesium oxide and zinc oxide curing agents. The temperature of the mixture was maintained at 100° C.–120° C. and mixing was continued for a period of about 5 minutes. This intensive mixing included kneading, shearing, and cross-over blending. The uniform admixture was then discharged from the Banbury and placed on a two roll mill and milled at a temperature of 80° to 90° C. The zinc oxide/magnesium oxide curing agents were added to the elastomeric mass and milling was continued for about 15 to 20 minutes.

The milled elastomer composition was then sheeted off the mill at a thickness of about 0.1 inch, placed in a 6 inch by 6 inch by 0.075 inch mold and cured at a temperature of about 160° C. for a period of 20 minutes. The property evaluation of the molded samples were done using standard test procedures shown in Table A.

Example 2

The process of Example 1 was repeated except that the elastomer composition consisted of a mixture of 70 parts polychloroprene and 30 parts EPDM (V 7000). All other ingredients are as set forth in Table 1, Ex 2.

Example 3

The process of Example 1 was repeated except that the elastomer composition consisted of a mixture of 70 parts polychloroprene, 30 parts EPDM and 10 parts Terpolymer ATX 350, the compatibilizer of this invention. Other ingredients are set forth in Table 1, Ex 3.

As can be seen from the data included in Table 1, the beneficial effects of compatibilization of CR/EPDM/Escor Acid Terpolymer ATX 350 (E-MA-AA), 70/30/10 alloys is evident in terms of significant improvements in heat ageing (both tensile strength and elongation change), ozone resistance, cut growth resistance and other physical properties. Addition of just EPDM alone (i.e., Ex 2 in Table 1) decreased the tensile, elongation, and abrasion resistance because of incompatibility of CR and EPDM. However, adding small amounts (10 parts by weight) of the compatibilizer of this invention, ATX 350, helped to bring these properties back up. In other words, the CR/EPDM blend is "incompatible" and has poor physical properties, while the CR/EPDM/E/AC/AA blend is a "compatible blend" and has good physical properties.

The physical properties of the compatibilized blend (Ex. 3 in Table 1) are generally superior both before and after exposure to heat, compared with that of the non-compatibilized blend (Ex. 2 in Table 1). Addition of EPDM to neoprene, in general, improved the ozone resistance. However, addition of the compatibilizer of this invention, ATX 350, to CR/EPDM, 70/30 blend, (Ex. 3 in Table 1) improved further the ozone resistance, specifically the dynamic ozone resistance. In the cut growth resistance tests, the compatibilized blend (Ex. 3 in Table 1) had vast improvement (lower the numerical value, the better) compared with that of neoprene (Ex. 1 in Table 1) and the binary blend (Ex. 2 in Table 1). This is a key property for PTBs application.

TABLE I

| Formulations of Compounds: | Neoprene Control "CR" Example 1 | Neoprene/ EPR "A" Example 2 | Neoprene/EPR/ E/AC/AA "B" Example 3 |
|---|---|---|---|
| Neoprene GRT | 100 | 70 | 70 |
| V7000 | — | 30 | 30 |
| ESCOR ATX 350 E/AC/AA Copolymer | — | — | 10 |
| VA-1801 | — | — | — |
| N650 | 40 | 40 | 40 |
| N762 | 30 | 30 | 30 |
| Sundex 790 | 10 | 10 | 10 |
| Stearic Acid | 2 | 2 | 2 |
| Octamine | 2.5 | — | — |
| AgeRite HP-S | 0.5 | — | — |
| Maglite D | 4.0 | 4.0 | 4.0 |
| Zinc Oxide | 5.0 | 5.0 | 5.0 |
| Mooney Viscosity (ML) 1 + 8 @ 100° C. | 61 | 82 | 76 |
| Mooney Scorch (MS), 132° C. | | | |
| $t_3$ (min) | 7.8 | 8.3 | 5.5 |
| $t_{10}$ (min) | 11.9 | 11.5 | 12.9 |
| ODR, 160° C. +3° arc | | | |
| $M_L$ (lb(f)-inch) | 10 | 17 | 16 |
| $M_H$ (lb(f)-inch) | 99 | 73 | 74 |
| $t_{s2}$ (min) | 2.4 | 2.5 | 2.4 |
| $t_c90$ (min) | 17 | 16 | 12 |
| Rate (slope) | 19 | 12 | 11 |
| Physical Properties Cure 20 min @ 160° C. | | | |
| 100% Modulus, MPa | 7.5 | 6.9 | 8.2 |
| 200% Modulus, MPa | 15.6 | 13.4 | 14.8 |
| Tensile, MPa | 19.0 | 15.4 | 16.5 |
| Elongation, % | 256 | 237 | 245 |
| Hardness, Shore A | 80 | 82 | 83 |
| Air Oven Age, 48 hr A 140° C. | | | |
| Tensile, MPa | 16.2 | 14.7 | 16.5 |
| Elongation, % | 115 | 149 | 172 |
| Hardness, Shore A | 88 | 88 | 87 |
| Air Oven Age, 96 hr @ 140° C. | | | |
| Tensile, MPa | 13.6 | 14.9 | 16.3 |
| Elongation, % | 49 | 95 | 109 |
| Hardness, Shore A | 90 | 90 | 90 |
| Static Ozone Resistance 100 pphm $O_3$, 37.8° C., Bent Loop | | | |
| Hours to 2× crack | 8 | >500 | >500 |
| Hours to visible crack | 184 | >500 | >500 |
| Dynamic Ozone Resistance 100 pphm $O_3$, 37.8° C. 0–25% Extension, 30 cycle/min | | | |
| Hours to 2× crack | 24 | 112 | 160 |
| Hours to break | 112 | 297 | 440 |
| De Mattia Cut Growth | | | |

TABLE I-continued

| Formulations of Compounds: | Neoprene Control "CR" Example 1 | Neoprene/ EPR "A" Example 2 | Neoprene/EPR/ E/AC/AA "B" Example 3 |
|---|---|---|---|
| Average Crack Rate (inch/megacycles) | | | |
| Room T, 120° angle (0.50 in) | 586 | 531 | 25 |
| 100° C., 90° angle (0.75 in) | 938 | 891 | 15 |
| Abrasion Resistance Pico Index | 92 | 81 | 92 |

II

Nitrile Rubber (NBR]/EPDM/Escor Acid Blends

Nitrile rubber (NBR), Vistalon 7000 and Escor Acid ATX 320 were compounded using a small scale (45 cc) Brabender mixer. The blend compositions are listed in Table 3 below. Blend samples were examined in the optical microscope as thin section (100–200 nm) using phase contrast. The NBR phase appeared dark grey and the V 7000 or Escor Acid Terpolymer phase appeared white. The Photomicrographs showed Escor Acid ATX 320 seems to have better interaction with NBR which resulted in better dispersion of the terpolymer in NBR matrix. This is also evident in the phase morphology of NBR/V 7000/Escor Acid Terpolymer ATX 320, 70/20/10 blend which had better dispersion (i.e. more surface area) of the V 7000 phase in NBR matrix.

TABLE 3

NBR/V 7000/ESCOR ACID TERPOLYMERS BLENDS

| Blends # | Blend Components | | |
|---|---|---|---|
| | (Paracril B) | V 7000 | ATX 320 |
| 1 | 70 | 30 | — |
| 2 | 70 | 30 | 5 |
| 3 | 70 | 20 | 10 |
| 4 | 70 | — | 30 |

III

Neoprene/EPDM/Escor Acid/Carbon Black Blends

Neoprene, Vistalon 7000, and ATX 350 were compounded in a ratio with 7/30/10 with carbon black (Ex 3 in Table 1). Transmission electron microscopic (TEM) technique was further utilized to characterize carbon black dispersion in these blends. Since large differences in unsaturation exist between neoprene and EPDM, we used osmium tetroxide staining in our TEM studies. This staining technique rendered the higher unsaturation neoprene polymer, more opaque to provide contrast for TEM analysis. Analysis of TEM data indicated the following:

Carbon black localized selectively in neoprene phase in the control blend of 70/30 neoprene/EPDM—CR GRT/V 7000 (Ex 2 in Table 1). A phase boundary existed between neoprene phase (which is "opaque") and EPDM phase (which is "light"). Since the carbon black aggregates localized in neoprene phase, the neoprene phase size increased and the "opaque/light" area ratio appears bigger than the corresponding blend of 70/30 neoprene/EPDM.

When the acid terpolymer was blended in to achieve at 70/30/10, neoprene/EPDM/ATX 350 ratio, carbon black dispersion was noted in both the neoprene (opaque) and EPDM (light) phases. A completely different morphology was noted, in particular, the neoprene phase size was not as big as in the control. Good phase boundary existed between the phases, however.

The composition of the two blends are listed in Table 1.

As is apparent from the foregoing description, the materials prepared and the procedures followed relate to specific embodiments of the broad invention. It is apparent from the foregoing general description and the specific embodiments that, while forms of the invention have been illustrated and described, various modifications can be made without departing from the spirit and scope of this invention. Accordingly, it is not intended that the invention be limited thereby.

What is claimed is:

1. A process for compatibilizing rubber blends consisting essentially of: blending a random terpolymer comprising ethylene, about 4 to about 40 weight % of acrylate or methacrylate, and about 1 to about 10 weight % of acrylic acid or methacrylic acid with nitrile rubber and a second rubber selected from the group consisting of ethylene propylene rubber, styrene butadiene rubber, natural rubber and ethylene propylene diene termonomer rubber, optionally carbon black, and optionally, a vulcanization system.

2. A compatibilized rubber blend comprising:
   (A) nitrile rubber;
   (B) ethylene propylene rubber, or ethylene propylene diene terpolymer;
   (C) ethylene/acrylate/acrylic acid random terpolymer comprising ethylene, about 4 to about 40 weight % of acrlyate or methacrylate, and about 1 to about 10 wt. % of acrylic acid or methacrylic acid;
   (D) optionally carbon black;
   (E) optionally a vulcanization system; and,
   (F) optionally one or more fillers, lubricants, plasticizers, tackifiers, coloring agents, blowing agents, or antioxidants.

3. The composition of claim 2 wherein the nitrile rubber is present at from 30 to 90 parts by weight.

4. A process for compatibilizing rubber blends consisting essentially of:

blending a random terpolymer comprising ethylene, about 4 to about 40 weight % of acrylate or methacrylate, and about 1 to about 10 weight % of acrylic acid or methacrylic acid with nitrile rubber and a second rubber selected from the group consisting of ethylene propylene rubber, styrene butadiene rubber, natural rubber, and ethylene propylene diene rubber, carbon black, a vulcanization system and optionally one or more other filler, lubricants, plasticizers, coloring agents, blowing agents or antioxidants.

5. The process of claim 1 or 4 wherein the second rubber is ethylene propylene rubber or ethylene propylene diene termonomer rubber.

6. The process of claim 1 or 4 wherein the acrylate of the terpolymer is methacrylate.

7. The process of claim 1 or 4 wherein the terpolymer is present at from 1 to 65 phr.

8. A composition of matter comprising a random terpolymer comprising ethylene, about 4 to about 40 weight % of acrylate or methacrylate, and about 1 to about 10 weight % of acrylic acid or methacrylic acid; nitrile rubber; and a second rubber selected from the group consisting of ethylene propylene diene termonomer rubber, ethylene propylene rubber, styrene butadiene rubber and natural rubber; and optionally carbon black; and optionally a vulcanization system; and optionally one or more other fillers, lubricants, plasticizers, tackifiers, coloring agents, blowing agents or antioxidants.

9. The composition of matter of claim 8 wherein the terpolymer comprises ethylene and about 4 to 40 wt. % of acrylate or methacrylate and about 1 to 10 wt. % acrylic acid or methacrylic acid.

10. The composition of matter of claim 8 wherein the nitrile rubber is present at 30 to 90 parts by weight and the terpolymer is present at 1 to 65 phr.

11. The composition of claim 8 formed into an article.

12. The composition of claim 8 formed into a power transmission belt, tire portion, belt, hose or air spring.

13. The composition of claim 8 wherein the carbon black is present at 3 to 50 phr.

14. The process of claim 1 or 4 wherein the terpolymer is present at from 5 to 20 phr.

* * * * *